United States Patent [19]
Bouchard

[11] Patent Number: 4,678,377
[45] Date of Patent: Jul. 7, 1987

[54] DISPENSER FOR PARTICULATE MATTER

[76] Inventor: Antoine J. Bouchard, 131 Milford St., Ext., Apt. 6B, Plainville, Conn. 06062

[21] Appl. No.: 725,248
[22] Filed: Apr. 19, 1985
[51] Int. Cl.[4] ............................................. B65G 53/38
[52] U.S. Cl. .................................... 406/139; 406/146; 222/630; 222/637
[58] Field of Search ............... 222/637, 632, 631, 630, 222/105, 92, 386.5; 239/327, 325; 406/122, 139, 140, 146

[56] References Cited

U.S. PATENT DOCUMENTS

| | | | |
|---|---|---|---|
| 2,618,883 | 11/1952 | Morsink | 222/386.5 X |
| 3,854,634 | 12/1974 | Hart | 406/139 X |
| 3,931,914 | 1/1976 | Hosaka et al. | 406/139 X |
| 4,249,839 | 2/1981 | Vance | 406/122 X |
| 4,417,802 | 11/1983 | Forbes | 222/386.5 X |

FOREIGN PATENT DOCUMENTS

| | | | |
|---|---|---|---|
| 618336 | 8/1978 | U.S.S.R. | 222/637 |

*Primary Examiner*—Charles A. Marmor
*Attorney, Agent, or Firm*—Epstein & Edell

[57] ABSTRACT

Dispensing of particulate matter such as powder via a gaseous stream is facilitated by placing the powder in an amorphous, manipulable pouch through which the gaseous stream flows. Squeezing and manipulating the pouch results in manipulation of the contained powder to control the amount of powder entrained in the gas stream. The pouch is supported with its outlet opening disposed generally downstream of its inlet opening in order to provide a direct, rather than a tortious, flow path through the pouch.

6 Claims, 6 Drawing Figures

FIG. 1
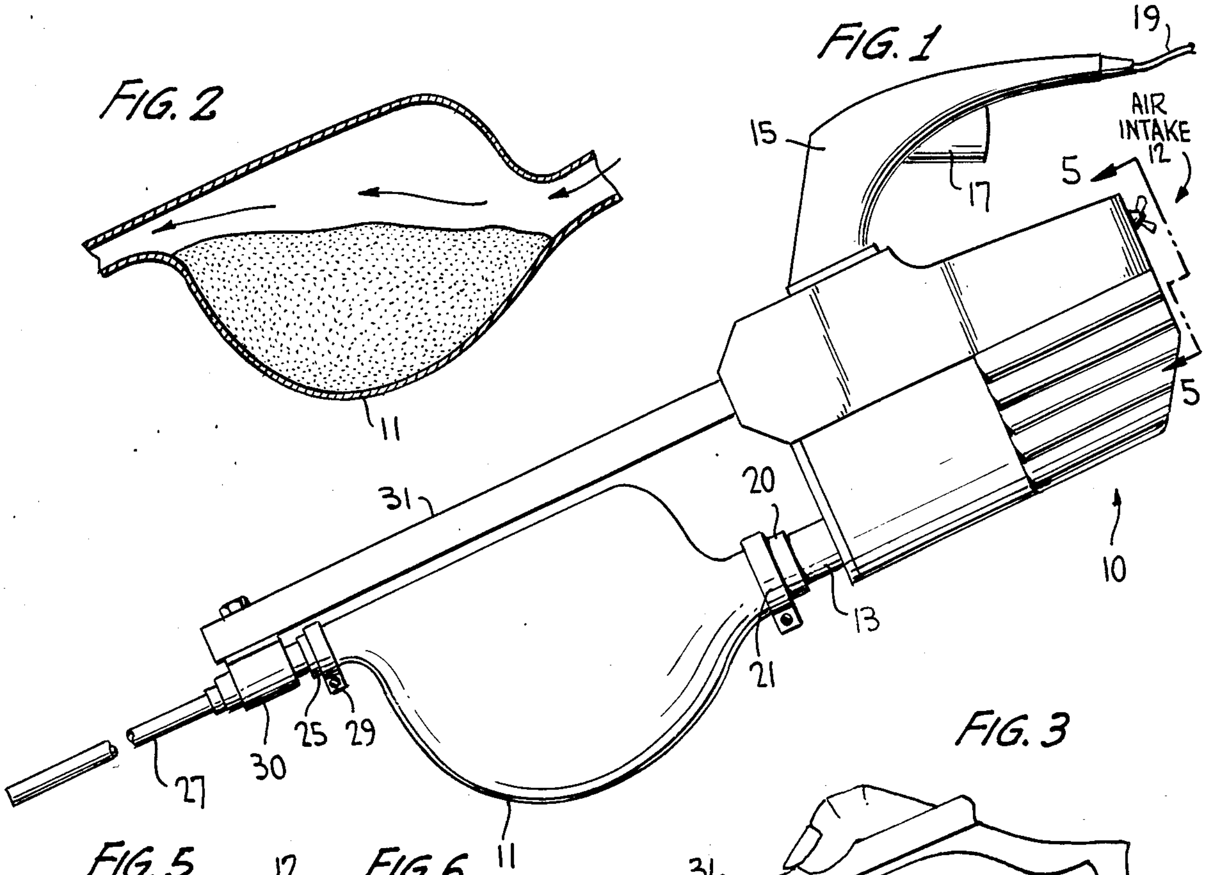
FIG. 2
FIG. 3
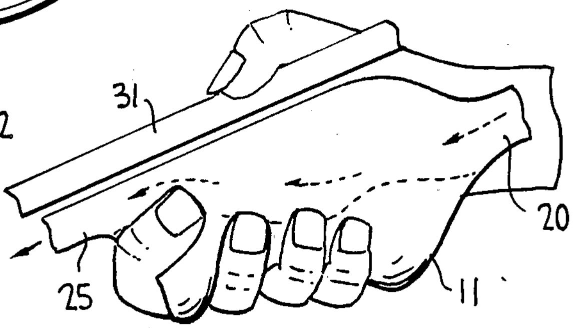
FIG. 5
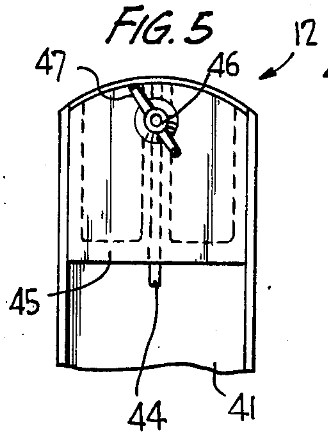
FIG. 6
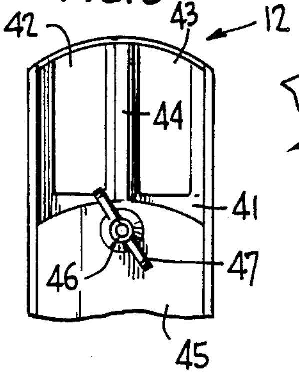
FIG. 4
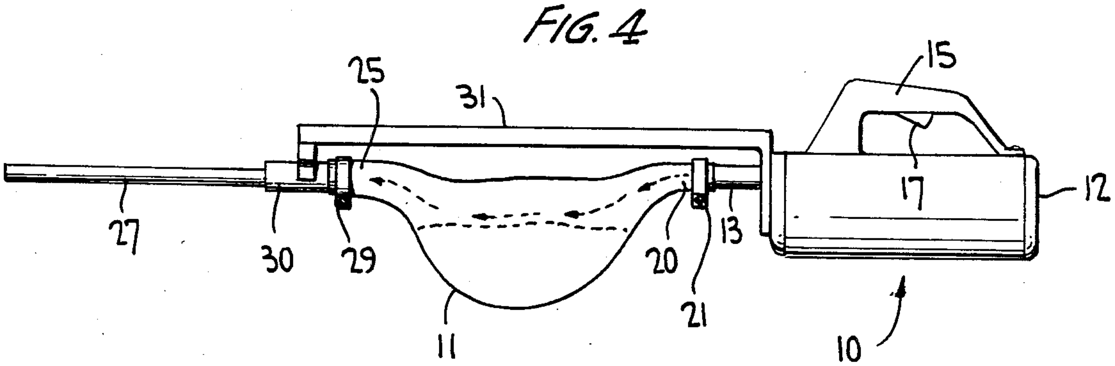

DISPENSER FOR PARTICULATE MATTER

BACKGROUND OF THE INVENTION

1. Technical Field

The present invention relates to a method and apparatus for dispensing powder or other particulate matter and, more particularly, to dispensing powders in a gaseous stream.

2. Discussion of the Prior Art

It is well known to dispense powder and other particulate matter via a gaseous stream. Examples of methods and apparatus for effecting such dispensing may be found in U.S. Pat. Nos.: 1,551,877 (Henning); 2,792,151 (Wagner); 2,802,302 (Yost); 2,961,129 (Bullock); 3,304,647 (Szekely); 3,174,251 (West); and 4,033,511 (Chamberlin).

Prior art dispensers of particulate matter are generally bulky and unwieldy and involve complex mechanisms to effect dispersal of the particulate matter in the gaseous stream. In addition, the particulate matter is generally required to pass through stream producing fan blades, hopper mechanisms or mixing blades which tend to clog as the particulate matter agglomerates thereon. Usually, there is no attempt to control the rate at which the particulate matter is entrained in the gaseous stream; however, where such attempts exist, they usually employ failure-prone and annoying agitating or vibrating mechanisms, or mechanical members which tend to clog. Because of these problems, none of the prior art devices of which I am aware are suitable for use in dispensing particulate matter, such as insecticide powder, in homes, offices and other commercial and industrual establishments.

OBJECTS AND SUMMARY OF THE INVENTION

It is therefore an object of the present invention to provide a method and apparatus for dispensing particulate matter via a gaseous stream where the rate of entrainment of the particulate matter into the stream is easily controllable without the need for complex mechanisms or mechanisms which tend to clog and fail due to agglomeration of the particulate matter.

It is another object of the present invention to provide a simplified method and apparatus for dispensing powder and other particulate matter via an air stream.

In accordance with the present invention powder to be dispensed is placed in an amorphous bag or pouch which can be easily manipulated to re-orient the powder therein. A gas inlet at one end of the pouch is adapted to receive a pressurized gaseous stream from an air blower, or the like. A gas outlet at the opposite end of the pouch directs the gas stream out of the pouch, preferably to an elongated delivery tube. By squeezing and manipulating the pouch and the powder therein, the amount of powder entrained in the gas stream within the pouch can be controlled. Structure is provided to support the pouch outlet downstream of the inlet in order to establish a direct, rather than a tortuous, path for the gas through the pouch.

BRIEF DESCRIPTION OF THE DRAWINGS

These and other objects, features and many of the attendant advantages of the present invention will be better understood upon a reading of the following detailed description when considered in connection with the accompanying drawings wherein like parts in each of the several figures are identified by the same references numerals, and wherein:

FIG. 1 is a side view in elevation of a preferred embodiment of the present invention;

FIG. 2 is a detailed view, partially broken away, of the interior of the pouch employed as part of the preferred embodiment, the pouch being shown in a relaxed state;

FIG. 3 is a view similar to that of FIG. 2 but showing the pouch in a manipulated state;

FIG. 4 is a view similar to FIG. 1 of a further embodiment of the present invention;

FIG. 5 is an end view in elevation taken along lines 5—5 of FIG. 1 and showing the air intake opening closed; and FIG. 6 is a view similar to FIG. 5 but showing the air intake opening open.

DESCRIPTION OF THE PREFERRED EMBODIMENTS

Referring specifically to FIG. 1 of the accompanying drawings, an air blower assembly 10 serves as a source of pressurized gas for issuing a gaseous stream into a pouch or bag 11. In this embodiment, the air blower 10 is the motor and fan portion of a commercially available electric broom; however, any assembly for providing a stream of air or any other gas may be employed. The air blower assembly includes an air intake opening 12 and an air output port in the form of a short rigid cylindrical tube 13. Handle 15 of assembly 10 has a trigger switch 17 for selectively actuating the internal motor and fan using convenience a.c. electrical power delivered via power cord 19.

Pouch 11 is an amorphous sack-like member having a soft flexible cylindrical extention serving as an inlet opening 20 and adapted to fit over tube 13. Hose clamps 21, 23 radially compress the pouch inlet 20 about air blower output tube 13. The pouch 11 is preferably made of leather, although any suitably manipulable material may be employed. Importantly, the pouch must be sufficiently soft and manipulable to permit it to be squeezed, compressed and shaken to reorient its powdered contents. An outlet opening 25, in the form of a soft flexible cylindrical extension of the pouch, is disposed at an opposite end of the pouch from inlet opening 20. Outlet opening 25 is disposed about an elongated discharge tube 27 extending outwardly from the pouch. Outlet opening 25 is secured about the discharge 27 in sealing relation by means of a hose clamp 29 and adapter 30. The hose clamp 29 radially compresses the outlet 25 about the adapter 30 which is of larger diameter than the discharge tube 27. The adapter serves to reduce the outflow path diameter to accomodate the smaller discharge tube.

A support rod 31 extends from air blower assembly 10 in a generally downstream direction and is secured at its distal end to the outlet opening extension 25 of the pouch by means of a clamp, or the like. The support rod serves to maintain a physical separation between the inlet 20 and outlet 25 of the amorphous pouch so that the gas flow through the pouch is along a generally direct downstream path rather than through a tortious path. For reasons to be described below, the inlet opening 20 of pouch 11 is disposed somewhat below the level of the outlet opening 25 when the discharge tube 27 is oriented horizontally.

The embodiment illustrated in FIG. 1 is intended for dispensing insecticide powder so that, in use, the discharge tube 27 and the flow path through pouch 11 are oriented downwardly from horizontal, normally at a declination in the range of 30° to 75°. When the unit is so oriented, powder in pouch 11 tends to collect at the forward or downstream end of the pouch, leaving an unblocked flow path between inlet opening and outlet opening 25 for the stream of gas delivered by air blower assembly 10. With the pouch relaxed (i.e., not manipulated by the user, as illustrated in FIG. 2), the stream passing through the pouch tends to entrain a small amount of contained powder or particulate matter which is issued through the discharge tube 27. Greater amounts of the particulate matter can be dispensed into the discharge tube by appropriately manipulating, squeezing, shaking, etc. the pouch 11 in the manner illustrated in FIG. 3.

For intended use with the flow path and discharge tube oriented horizontally, the inlet and outlet opening can be appropriately aligned in the manner illustrated in the embodiment of FIG. 4. In fact, any appropriate alignment of the inlet and outlet openings of the pouch may be provided to accomodate the orientation of the unit in use.

The air intake opening 12 of air blower assembly 10 may be provided with a slidable cover to permit selective adjustment of the air flow through pouch 11. Such an arrangement is illustrated in FIGS. 5 and 6 of the accompanying drawings to which specific reference is now made. The air blower assembly includes an end panel 41 having large opening 42, 43 defined therein for admitting air into the blower assembly. An elongated slot 44 is also defined in end panel 41 at a location intermediate openings 42 and 43. A cover 45 is slidably mounted on the end of the air blower assembly in front of end panel 41. A bolt 46 has its head disposed on the side of panel 41 opposite cover 45 and projects through slot 44 and a suitably provided hole in cover 45. A wing-nut 47 engages the outwardly projecting opposite end of bolt 46. Cover 45 can be slid from one position to another along panel 41 and the dimension of slot 44 to selectively cover and uncover more or less of openings 42, 43. In any position, wing-nut 47 may be tightened to hold cover 45 in place.

The essence of the invention is the use of a manipulable pouch to control the orientation of particulate matter therein so that the particulate matter can be controllably dispensed into a stream of gas flowing through the pouch. The dispensing mechanism thereby eliminates mechanical parts which tend to clog and fail. The device is simple to use and inexpensive to fabricate.

Having described several embodiments of a new and improved dispenser for particulate matter constructed in accordance with the present invention, it is believed that other modifications, variations and changes will be suggested to those skilled in the art in view of the disclosure set forth hereinabove. It is therefore to be understood that all such variations, modifications and changes are believed to fall within the scope of the present invention as defined in the appended claims.

What I claim is:

1. Apparaus for dispensing particulate matter via a gaseous stream comprising:

an amorphous, peripherally manipulable and flexible bag for containing said particulate matter, said bag having a gas inlet opening and a gas outlet opening;

means for delivering a stream of gas into said bag via said inlet opening;

means for discharging said gas from said bag via said outlet opening; and structural means for positioning said outlet opening in fixed spaced relation to said inlet opening;

wherein said bag is manipulable to control the position of particulate matter therein to thereby control the amount of particulate matter discharged from said bag with said gaseous stream;

wherein said means for delivering issues said stream of gas into said bag in a downstream direction, and wherein said structural means includes means for positioning said outlet opening generally downstream of said inlet opening;

wherein said means for discharging is an air blower assembly having an air output port secured to said gas inlet inflow communication therewith, and wherein said structural means comprises:

extension means rigidly secured to said air blower assembly and extending generally downstream from said air output port; and clamping means for securing said extension means to said bag proximate said outlet opening.

2. The apparatus according to claim 1 wherein said output port is a rigid tube, and wherein said inlet opening is a flexible tubular projection from said bag which fits over said rigid tube, and further comprising a tube clamp for radially compressing said flexible tubular projection about said rigid tube.

3. The apparatus according to claim 2 wherein said means for discharging includes an elongated discharge tube, wherein said bag outlet opening is a further flexible tubular projection from said bag which fits over said discharge tube, and further comprising clamp means for radially compressing said further flexible tubular projection about said rigid tube.

4. The apparatus according to claim 3 wherein said structural means includes an elongated rod extending in a generally downstream direction and having a first end secured to said blower assembly and a second end secured to said bag, said rod extending generally parallel to said discharge tube.

5. The apparatus according to claim 1 wherein said air blower assembly includes an air intake opening and means for selectively varying the size of said air intake opening.

6. Apparatus for dispensing particulate matter via a gaseous stream comprising:

an amorphous, peripherally manipulable and flexible bag for containing said particulate matter, said bag having a gas inlet opening and a gas outlet opening;

means for delivering a stream of gas into said bag via said inlet opening; and means for discharging said gas from said bag via said outlet opening;

wherein said bag is manipulable to control the position of particulate matter therein to thereby control the amount of particulate matter discharged from said bag with said gaseous stream; and wherein said means for discharging includes an elongated discharge tube, wherein said bag outlet opening is a flexible tubular projection from said bag which fits over said tube, and wherein said apparatus further comprises clamp means for radially compressing said flexible tubular projection about said tube.

* * * * *